July 31, 1962 P. L. GRAFSTEIN ET AL 3,047,225

SYSTEM FOR RECORDING AND READING OUT DATA

Filed April 2, 1959 2 Sheets-Sheet 1

INVENTORS
ROBERT MEISEL, PAUL GRAFSTEIN
And GEORGE PANCHAK

BY Mock & Blum
ATTORNEYS

INVENTORS
ROBERT MEISEL, PAUL GRAFSTEIN & GEORGE PANCHAK
BY Mock & Blum
ATTORNEYS

United States Patent Office 3,047,225

Patented July 31, 1962

3,047,225

SYSTEM FOR RECORDING AND READING OUT DATA

Paul L. Grafstein, Brooklyn, and Robert Meisel and George P. Panchak, Westbury, N.Y., assignors to Matronics, Inc., a corporation of New York Filed Apr. 2, 1959, Ser. No. 803,670

3 Claims. (Cl. 235—92)

This invention relates to improvements in calculating and computing machines, and in particular relates to improved means for recording, storing and indicating changes in digital quantities.

The present invention is particularly well-suited to use in a machine for inventory control where a record is kept of such factors as inventory, sales and merchandise in process for a wide variety of products; ticket reservations, etc. Such machines commonly require for each product or item under control means for recording, storing and indicating information relating to a considerable number of items.

In accordance with a preferred embodiment of the invention, a plurality of memory devices are associated with a single indexing shaft. A series of spaced gears are mounted upon the indexing shaft for driving the respective memory devices, and means are provided for turning the shaft in a selected indexing movement.

At least one memory device is associated with each gear which is mounted upon the indexing shaft, and when the gears mesh, the memory device can be turned in an appropriate indexing movement. As an important feature of the invention, the memory device is mounted so that its gear is normally out of engagement with the corresponding indexing shaft gear. Means are provided for selectively moving one or more of the memory devices associated with the indexing shaft into engagement with a coresponding drive gear.

As a further important feature of the invention, a plurality of elongated and parallel conductors are mounted in parallel relationship to the indexing shaft and in position to be engaged by contact members mounted upon the respective memory devices. Each of these conductors has associated therewith any suitable electrical or electromechanical indicating device so that a count may be determined depending upon the turned position of a particular memory device.

As a further important feature of the invention, when any memory device is in engagement with a gear of the indexing shaft, it is out of electrical contact with the conductors. As a result, the indexing or counting circuits are entirely separate from the read-out circuits.

As further important advantages of the invention, there is no wiping of the output read-out conductors during rotation of a memory device when it engages a gear of the indexing shaft. The memory assemblies are replaceable at will, and do not require any adjustments in position. Means are provided for preventing the memory devices from vibrating or otherwise shifting position while they are not being indexed.

While in a preferred embodiment of the invention, ten conductors are associated with each memory device, making it possible to count to base 10, it is also possible, with relatively minor circuit modifications, to use the same ten conductors to count to base 50.

A further important feature of the invention resides in its compact construction, making it possible to provide two or more memory devices at each level of an indexing shaft.

As an important advantage of this invention, the recording and reading of information relating to the digital quantity of a considerable number of items is readily accomplished with a minimum of costly electrical wiring, and without expensive information storing devices, such as the costly magnetic drums frequenly used in computers.

Figure 1:
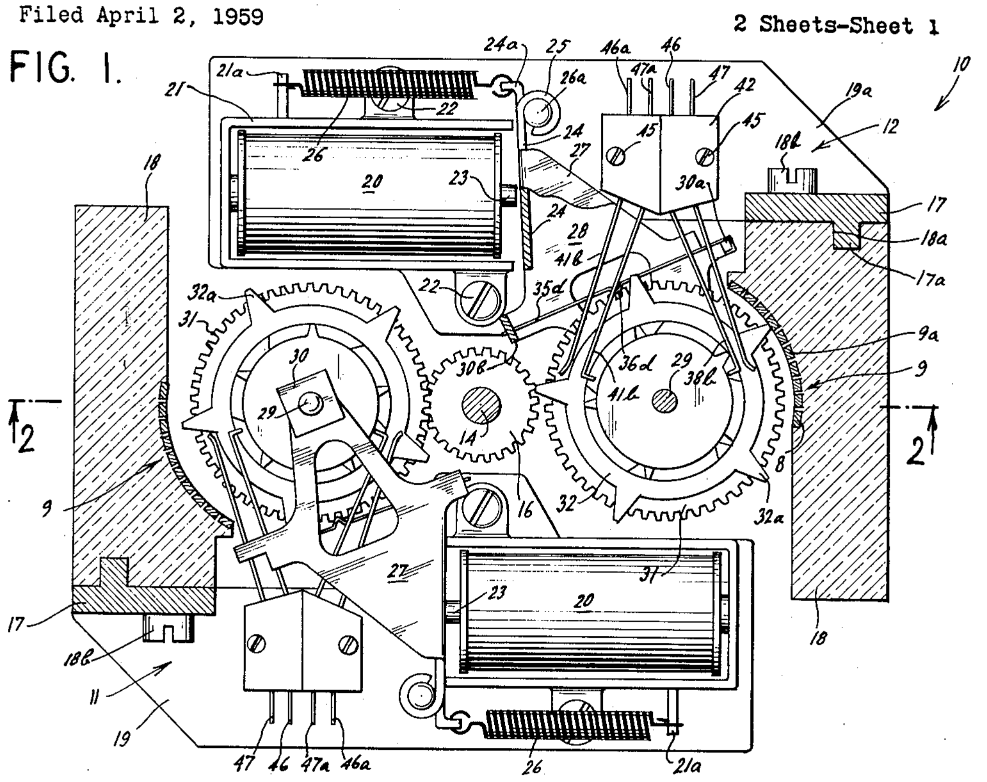
FIG. 1 is a horizontal cross-section of one basic unit of a computing machine in accordance with this invention.
Figure 2:
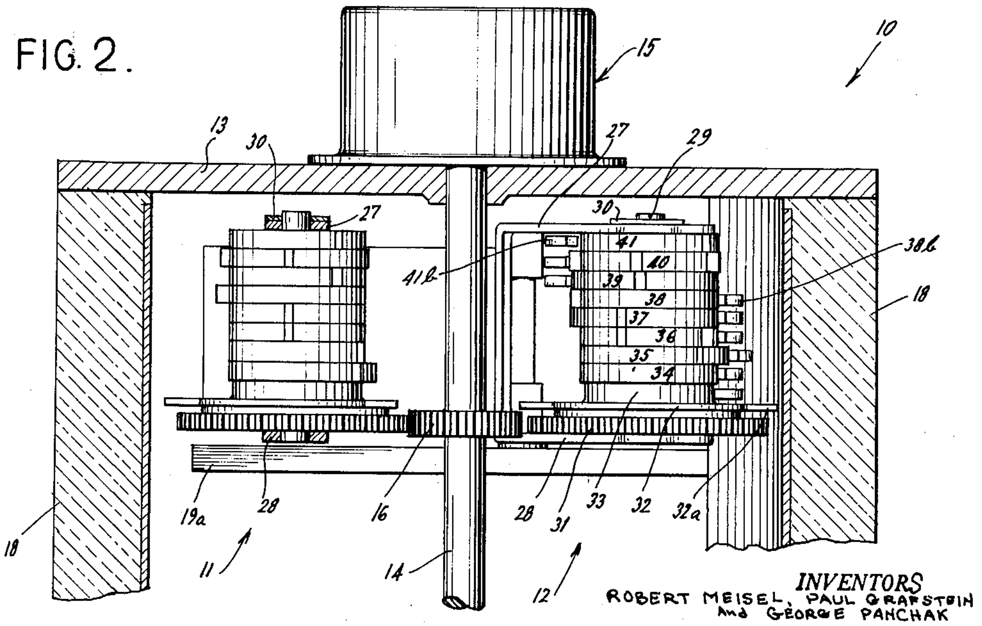
FIG. 2 is a partial fragmentary section on line 2—2 of FIG. 1.

The drawing shows essentially one memory unit 10 which is optionally one of a series of memory units of a calculating and computing machine. The drawing also shows two of the specific memory devices 11 and 12 of the one memory unit 10.

As an important feature of the invention, a large computing machine may be formed of a plurality of units 10 each having memory devices 11 and 12, together with associated electrical circuit elements.

Said memory unit 10 has a top wall 13 (assuming that the device is oriented in the manner shown in the drawing). A central vertical drive shaft 14 extends turnably through a central opening in wall 13 and is also turnably supported at its other end by any suitable means (not shown).

Shaft 14 connects above wall 13 with a drive unit 15, which contains means for turning shaft 14.

A plurality of drive gears 16 are mounted upon shaft 14 in spaced relationship to each other. Each of said gears 16 is adapted, under appropriate conditions, to operate a memory device 11 or 12 as the case may be. Only one of said gears 16 is shown.

Unit 10 has a pair of opposed frame members 18 which extend the full height thereof and which are connected in opposed relationship by any suitable means (not shown). At the approximate level of each drive gear 16, respective platforms 19 and **19*a* are fixed to the respective frame members 18, respectively at the front and rear of unit 10. Platform 19 supports memory device 11, and platform 19*a* supports memory device 12. Each of said platforms has an upstanding flange 17 which abuts the associated end of a frame member 18. Such flange 17 has a protruding key member 17*a* which extends into a corresponding vertical slot 18*a* of frame member 18. These vertical slots 18*a* extend the full height of frame member 18. Each flange 17 is secured in place by a screw 18*b* which extends through an appropriate opening of flange 17 and into a threaded recess in frame member 18. Each said platform 19 and 19*a* extends laterally from the frame member 18 to which it is connected toward the other frame member 18, and said platforms 19 and 19*a* respectively extend in front of and behind shaft 14**.

The two memory devices 11 and 12 operate independently of each other and are of the same construction. The use of the two memory devices at each level of memory unit 10 is optional, but illustrates the value of the design in accordance with this invention as making it possible to provide a maximum number of memory devices in minimum of space.

Since the two memory devices 11 and 12 are the same, the following description will be with reference to memory device 12, but it will be apparent that the description will be equally applicable to memory device 11.

Said memory device 12 includes a solenoid 20 mounted upon platform **19*a* by means of bracket 21 and screws 22. The core 23 of solenoid 20 has an axis which is parallel to the horizontal platform 19*a*, and core 23 protrudes from solenoid 20 at the inner end thereof. Armature 24 extends generally vertically and extends across the axis of core 23. Armature 24 is provided near its outer end with a bearing 25 for reception of a vertical pivot 26*a* which is fixed to platform 19*a*. The outer end of armature 24 is provided with a bracket portion 24a upon which one end of return spring 26 is mounted. This return spring 26 extends outwardly from bracket 24a in a direction generally parallel to the axis of plunger 23. The outer end of spring 26 is fixed to a portion 21a of frame 21. Any other suitable return means for armature 24** may be provided.

Parallel horizontal yoke plates 27 and 28 are respectively fixed to the upper and lower edges of armature 24, by any suitable means. These plates 27 and 28 extend from armature 24 at an angle relative to the axis of core 23, with their free ends disposed in lateral alinement with shaft 14 and spaced therefrom.

A vertical shaft 29 extends through the plates 27 and 28 adjacent their free ends and is secured thereto by any suitable means, not shown in detail, which securing means may optionally include retaining ring 30.

A gear 31 is mounted upon shaft 29 at substantially the same level as gear 16. Gear 31 is adapted to mesh with gear 16, although it is normally held out of engagement therewith by spring 26.

A plurality of elements for the control of electric circuits are mounted upon shaft 29 in such a way as to turn in unison with gear 31. The exact manner of mounting the circuit elements on shaft 29 may be varied and is not shown in detail. In the embodiment illustrated in the drawing, a metal star wheel 32 is mounted upon the shaft 29 just above gear 31. This element 32 may be defined as a memory wheel because it is utilized in recording the turned position of the memory device corresponding to a particular quantity which has been recorded. Said memory wheel 32 may have an annular main portion which is fixed to the hub of gear 31, or may have any other suitable shape. A plurality of equally spaced metal tips or contact elements 32a extend outwardly from the periphery of element 32 and are preferably equally spaced around the periphery thereof. In the preferred embodiment, there are five such contact tips 32a but in certain instances there may be ten tips 32a or any other suitable number.

A plurality of cam disks 33, 34, 35, 36, 37, 38, 39, 40 and 41 are mounted on shaft 29 above element 32, for purposes to be explained below. As indicated above, the cam disks turn in unison with element 32 and gear 31. In certain instances the number of cam disks may be varied depending upon the particular use to which the memory device is to be put.

Any suitable means are provided for ensuring that gear 31 and its associated contact elements will turn in precise indexing movements in accordance with the indexing movements of gear 16. In the embodiment shown in the drawing, plate 27 is provided with a pair of lugs 30a and 30b depending therefrom at its side edges and located between armature 24 and gear 31. A blade spring 35d extends between lugs 30a and 30b and is secured thereto by any suitable means. The plane of spring 35d is vertical. At its center spring 35d has a bend or bight 36d which extends toward gear 31 and which abuts gear 31 frictionally and which is adapted to mesh within adjacent teeth of gear 31. When gear 31 meshes with gear 16 and when gear 16 is turned a selected fraction of a revolution in an indexing movement, the detent 36d assures that inertia will not carry gear 31 beyond its selected position when it is moved out of engagement with gear 16.

In order that memory wheel 32 may complete appropriate electrical circuits, a so-called read-out unit 9 is mounted upon frame member 18. As an important feature of the invention, this so-called unit 9 actually occupies only substantially one-fifth of the complete circumference of a circle. Frame member 18 is shaped to have an arcuate surface 9a adjacent wheel 32 and extending the full height of memory unit 10. Said arcuate surface 9a preferably corresponds to substantially one-fifth of the arc of a cylinder centered upon shaft 29.

A plurality of bars 8 are fixed to surface 9a and extend vertically and are circumferentially spaced.

These ten bars together occupy a space slightly less than the distance between the outer ends of contact tips 32a of wheel 32. The location of detent 36d is such that at the conclusion of an indexing movement of gear 31, and with armature 24 in its normal or retracted position, a single contact tip 32a makes electrical contact with a single bar 8. Furthermore, when an indexing movement carries one tip 32a out of position for contact with one of the end bars 8, the next tip 32a goes into position for contact with the bar 8 at the other end of unit 9. Accordingly, wheel 32 is adapted to make fifty electrical contacts with bars 8 corresponding to a complete revolution of wheel 32.

It will be apparent from the drawing, that the contact tips 32a only engage bars 8 while wheel 32 is at rest. This is the normal position of memory device 12, as shown in the drawing.

When the solenoid 20 is energized, as in the case of memory device 11 in the drawing, contact tip 32a is out of electrical contact with any of the bars 8 while gear 31 meshes with and is indexed by gear 16. This feature of the invention ensures that there is no wiping of the read-out contacts of the memory device, which contributes greatly to the mechanical efficiency and longevity and freedom from repair of the memory devices. Furthermore, each read-out unit 9 serves a plurality of memory devices 12, thereby reducing the number of circuit elements and wiring which are necessary.

It will be apparent without extended description that a corresponding read-out unit 9 is associated with memory unit 11.

The cam disks 34, 35, 36, 37, 38, 39, 40 and 41 control a plurality of switches which are mounted on switch block 42. Said switch block 42 is fixed to the upper face of platform 19a. Switch block 42 is secured to platform 19a by screws 45 or by any other suitable means.

A plurality of switches extend from switch block 42 toward the cam disks.

FIG. 1 shows a right-hand switch 38b consisting of switch arms which are adapted to be closed by the cam projection 38a of cam disk 38 when gear 31 is in its read-out position of memory device 12 shown in FIG. 1. Similarly, further switches 37b, 36b, 35b and 34b are located below and in vertical alinement with switch 38b and adapted to be respectively closed by cam projection 37a of cam 37, cam projection 36a of cam 36, cam projection 35a of cam 35, and cam projection 34a of cam 34 when the memory device is in the read-out position. These additional switches and the associated cams are shown schematically in FIG. 3.

FIG. 1 also shows terminals 46 and 47 extending out of the rear of switch block 42 and electrically connected to the arms of switch 38b (the electrical connections are not shown). Similarly, further terminals extend rearwardly from switch block 42 in correspondence with the respective switches 37b, 36b, 35b and 34b.

FIG. 1 also shows the arms of switch 41b extending forwardly from switch block 42 and on the left side thereof. This switch 41b is adapted to be closed by the cam projection 41a of cam disk 41 when the memory device is in the read-in position as exemplified by memory device 11 in FIG. 1. The terminals 46a and 47a extend to the rear of switch block 42 corresponding to the arms of switch 41b.

In a similar manner switches 40b and 39b extend from switch block 42 in vertical alinement with switch 41b and in respective position to be closed by cam projections 40a of cam disk 40 and by cam projections 39a of cam disk 39 when the memory device is in its read-in position.

It will be apparent from the foregoing that the electric circuits corresponding to the read-in position of the memory device are only actuated while the memory device is in its read-in position and while it is being indexed.

On the other hand, the read-out circuits of unit 9 and of the cam disks 34, 35, 36, 37 and 38 can only be actuated while the memory device is in its read-out position and is not being indexed. This feature makes it possible to simplify the electric circuits of the memory unit.

As another important feature of the invention, it is possible to change the operating characteristics of the mechanism by merely removing shaft 29 with its associated gear 31 and cams and replacing it with a different shaft having different cams. In many instances this may be done with only a minimum of changes in the electric circuit elements connected to the various terminals on the rear of switch block 42 and read-out bars 8. Thus, by way of example, in certain applications it may be possible to dispense with the cam disks 34, 35, 36, 37 and 38.

*Electrical Circuit*

Figure 3:
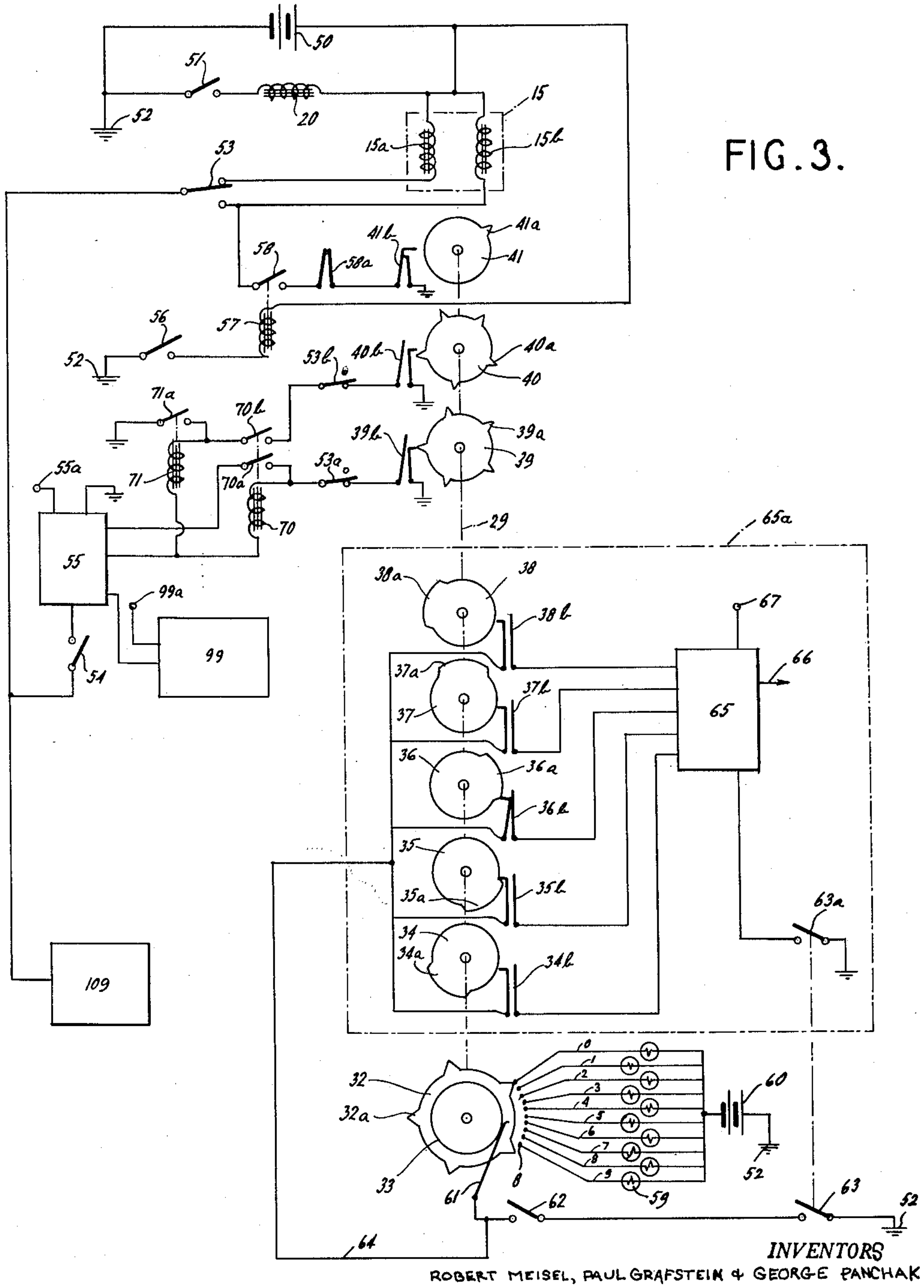
FIG. 3 is a schematic electrical circuit diagram of the invention.

While a number of electric circuits are possible in accordance with this invention, one representative electrical circuit is shown schematically in FIG. 3. FIG. 3 also illustrates the relationships of the various cams necessary for proper operation of such representative circuits.

FIG. 3 shows a voltage source 50, which is optionally a source of direct voltage. This voltage source is connected in series with memory select electro-magnets 20 and memory select switches 51, and the junction between voltage source 50 and switches 51 is grounded at 52. While only one electro-magnet 20 and one switch 51 is shown, it will be apparent that there optionally can be as many of these elements as there are memory units. When switch 51 is closed, thereby energizing electro-magnet 20, memory device 12 is moved to its read-in counting position.

As is also shown in FIG. 3, casing 15 contains an "add" electro-magnet **15*a* and a "subtract" electro-magnet 15*b*. Depending upon which of these electro-magnets is energized, shaft 29 will be turned in either a clockwise or counterclockwise direction, as the case may be, to perform an adding or substracting operation, when its electro-magnet 20 is energized by closing switch 51. The means coupling electro-magnets 15*a* and 15*b* and shaft 29** are conventional and are not shown.

The two-position add-subtract switch 53 is shown illustratively in FIG. 3 in its "add" position, in which add electro-magnet **15*a* is connected in circuit. The ungrounded side of voltage source 50 is connected through electro-magnet coil 15*a* and switch 53 to one side of the digit selection switch 54. For convenience of illustration, only one of the switches 54 is illustrated, but it will be apparent that there will be a plurality of such switches 54 depending upon the number of pulses which are to be given to the memory device. The other side of switch 54 is connected through pulse generator 55 to ground 52, thereby completing the electric circuit of add electro-magnet 15*a*. Pulse generator 55 is conventional and is not shown in detail. However, according to well-known practice, and depending upon which switch 54 is closed, a selected number of pulses of electrical energy are supplied to electro-magnet coil 15*a*, thereby turning shaft 29** in a selected number of steps.

FIG. 3 also shows "9" carry switch **39*b* which is adapted to be closed by the five equally spaced cam projections of cam disk 39, and shows "0" carry switch 40*b* which is adapted to be closed by the five equally-spaced cam projections 40*a* of cam disk 40**. These carry switches are for the purpose of carrying a count from one memory device to a successive memory device.

Illustratively, if a machine is adapted to count units, tens and hundreds, switches **39*b* and 40*b* may be actuated by a unit memory device, when the count exceeds a selected figure such as "9," and may in turn actuate the tens memory, so as to carry the count to the tens column. Similarly, the corresponding switches 39*b* and 40*b*** of the tens memory may have their terminals connected in the circuit of the hundreds memory device so as to carry the count thereto.

With switch 53 in its add position, and assuming that shaft 29 is then turned in a clockwise direction, as viewed in FIG. 1, switch **39*b* and switch 40*b* are each closed once over a fifth of a revolution of shaft 29, or once in ten counts. Switch 39*b* is closed one count ahead of switch 40*b***.

When switch **39*b* is closed, a circuit is completed from ground through switch 39*b*, add-subtract switch 53*a* (which operates in unison with switch 53), relay coil 70, pulse generator 55 and voltage terminal 55*a* to one side of a power supply (not shown), the other side of which is grounded. Said pulse generator 55 contains known circuit (not shown) for supplying an electrical voltage pulse to relay coil 70 during count and carry time. Accordingly, relay coil 70 is energized and its contacts 70*a* and 70*b* are closed. This completes a further known circuit (not shown) of pulse generator 55 for supplying a further voltage pulse to relay coil 70** during count time, but not carry time.

If during the same count time when switch **39*b* is closed, the count continues so that switch 40*b* is closed, relay coil 70 remains energized, and contatcs 70*a* and 70*b* remain closed. Also, a circuit is completed from ground though "0" switch 40*b*, add-subtract switch 53*b* (which operates in unison with switch 53), relay contacts 70*b*, relay coil 71**, and the above-mentioned pulse generator circuit which supplies a pulse during count and carry time.

Relay coil 71 is thereby energized, closing its relay contacts **71*a*. This completes the connection to pulse generator 55 of one terminal of carry network 99, another terminal of which is connected to a known circuit (not shown) of pulse generator 55 which supplies a voltage pulse only during carry time. The carry network utilizes this pulse to complete a circuit from carry terminal 99*a* to ground. This terminal 99*a* is connected to add-subtract switch 53 of the next higher memory and hence through the add coil to the voltage source thereof. (FIG. 3 shows the connection of a lower memory carry network 109 to the add-subtract switch 53** of the illustrated memory.) As a result, a count pulse is supplied to the next higher memory.

It will be apparent without extended discussion that the carry result will be the same even if the previous count has stopped with the memory positioned at "9."

With switches **53, 53*a* and 53*b* in subtract position, a subtract carry is initiated to the next higher memory by successive closing of switches 40*b* and 39*b***. The circuits for subtract carry are analogous to the circuits for add carry and are not shown.

Cam 41 serves as a reset switch, in case it is desired to reset the memory to "0." One side of reset switch 56 is grounded at 52 and the other side of switch 56 is connected through reset relay coil 57 to the ungrounded side of voltage source 50. Accordingly, when switch 56 is closed, relay coil 57 is energized, thereby closing its associated relay contacts 58. This completes a series connection (through ground 52) of voltage source 50, subtract coil **15*b*, switch 58, interrupter switch 58*a*, cam switch 41*b* and ground 52. Each time that an electric pulse passes through the series circuit, switch 58*a* momentarily opens and then closes. This permits a succession of stepping pulses to pass through subtract coil 15*b*. The repeated energization of subtract coil 15*b* causes shaft 29 to be stepped until cam projection 41*a* of cam 41 strikes and opens switch 41*b*. This position of cam projection 41*a* corresponds to the "0" position of the memory device. With switch 41*b* open, coil 15*b* is no longer energized and the stepping action ceases. Switch 56** can then be opened.

The read-out circuit includes, as a minimum, the read-out bars 8, signalling devices 59 respectively associated with each bar 8, and a further source of voltage 60. This is optionally a source of direct current. One side of voltage source 60 is grounded at 52 and the other side of voltage source is connected to the respective indicating devices 59 of the respective bars 8.

Depending upon the turned position of wheel 32, a respective bar 8 is connected via the metal wheel 32 and metal disk 33 to wiper arm 61. Said wiper arm 61 is connected through a read-out switch 62 and a further read-out switch 63 to ground 52. Said switch 63 is a general read-out switch. There is a read-out switch 62 associated with each memory device, and for convenience of illustration, only one such memory switch 62 is shown.

It will be apparent that when switches 62 and 63 are closed, the particular indicating device 59 will be energized, depending upon the turned position of the memory device. By way of illustration, the indicating devices 59 may be lighted numbers from "0" to "9." Any other suitable indicating or recording device may be employed.

In the event that counts greater than tens are desired, wiper arm 61 is also connected by lead 64 to optional circuit elements which are shown enclosed and set off by the rectangular broken line 65*a* and which include the aforementioned cam disks 34, 35, 36, 37 and 38.

The respective cams 34*a*, 35*a*, 36*a*, 37*a* and 38*a* each extend about substantially one-fifth of the circumference of their associated cam disks and are staggered so that the respective switches 34*b*, 35*b*, 36*b*, 37*b* and 38*b* are successively closed during a complete revolution of shaft 29. Each switch 34*b*, 35*b*, 36*b* 37*b* and 38*b* is closed for substantially one-fifth of a revolution.

Line 64 extends through the respective switches 34*b*, 35*b*, 36*b*, 37*b* and 38*b* and a decoding unit 65. Read-out selector switch 63*a* which is ganged to switch 63 is connected to ground 52. Hence, when read-out selector switch 63*a* is closed, and when a respective switch 34*b*, 35*b*, 36*b*, 37*b* and 38*b* is closed, an electric circuit is completed between voltage source 67 and appropriate circuit elements in decoder unit 65. By way of example, switch 36*b* is shown closed by cam 36*a*. Decoder 65 is not shown in detail, but may be any suitable decoding equipment depending upon the type of count which is desired. Decoding unit 65 has output terminals 66 (only one is shown) which may be coupled to any suitable indicating device, which optionally may be similar to the indicating devices 59. Switch 62 is closed shortly after switch 63 to complete the read-out circuitry of unit 65 at selected output terminal 66 as the result of the closing of one of the switches 34*b*, 35*b*, 36*b*, 37*b* and 38*b*.

By way of illustration, the respective cam disks 34, 35, 36, 37 and 38 may be utilized for counting by tens to base 50. For example, with cam 34*a* closing switch 34*b*, the device may indicate numbers from "0" to "9." With switch 35*b* closed, numbers from "10" to "19" may be indicated, and it will be apparent that in this way numbers from "0" to "49" may be indicated by the memory device. It will be apparent that by connecting memory devices in sequence, large numbers may be recorded. For example, it can be assumed that the memory device 65 shown in FIG. 3 indicates numbers from "50" to "2500," while the units memory device indicates numbers from "0" to "49." The number indicated in FIG. 3 would then be "1000." If a single impulse were then fed to this memory device, moving the star wheel to the position marked "1," the quantity recorded by this memory device would be "1050." It will be further apparent that if a series of pulses of the unit counter carry it past the count of "40" to the count of "50," it is necessary that a pulse be supplied to the fifties counter.

In a similar way, as the count of the base 50 counter turns from "2450" to "2500," which corresponds to its "0" reading, the switches 39*b* and 40*b* cause a pulse to be sent to the base 2500 counter which records and reads out numbers starting with "2500."

While it is possible to supply all of the pulses to a chain of memory devices through the units counter, it is obviously more convenient, in counting large quantities, to utilize switches 63 and 62, and supply a count directly to the base 50 counter. This means, of course, that a quantity such as "109" would have to be broken down into a nine count pulse to be supplied to the units counter and a two count pulse to be supplied to the base 50 counter. This may be done by any suitable means which are not shown, but the corresponding means for converting a read-out of the memory device to the decimal system are indicated schematically in FIG. 3. Thus, in FIG. 3 it is necessary that the reading corresponding on the fifties scale of "1000" must be combined in decoder 65 with a reading of the units counter by any appropriate electrical means, so as to produce a decimal reading if such be desired.

From the foregoing, it will be apparent that the memory devices can be extremely compact and at the same time are adapted to read-in and read-out to both base 10 and base 50, depending on their external circuits. Other read-in and read-out bases can also be employed. The number of bars 8 determines the minimum base, and the number of points 32*a* determines the maximum base. The contact points 32*a* must be equally spaced, and the angular distance between successive points must be equal to the angular size of the bar unit 9 plus the space for one bar.

By way of example, ten bars 8 were employed because base 10 is desirable for count purposes. Two points 32*a* would give a second base 20 but would not work mechanically because points 32*a* would not make good electrical contact with the end bars 8. Three points 32*a* are similarly undesirable. Four points 32*a* would give a second base 40 which is mathematically poor. Five points 32*a* give base 50 which is desirable because it divides into 100 and results in a good mechanical arrangement. The use of five points requires that the bar unit take up one-fifth of a circle.

While we have disclosed a preferred embodiment of the invention, and have indicated various changes, omissions and additions which may be made therein, it will be apparent that various other changes, omissions and additions may be made therein, without departing from the scope and spirit of the invention.

We claim:

1. An information recording and indicating system comprising a longitudinally extending shaft, a plurality of moving memory units, means mounting said memory units in longitudinally spaced, aligned array so as to be each turnable about a longitudinal axis which is parallel to the axis of said shaft and so as to be individually movable towards and away from said shaft, said shaft having drive means adapted to engage a memory unit when it is moved towards said shaft, means for turning said shaft for pre-determined degrees of rotation in accordance with a number to be stored, each of said memory units having a pre-determined number of angular positions for storing a number as an angular displacement, each of said angular positions indicating a different value for a stored number, means for selectively moving one of said memory units into operative engagement with said drive means while said shaft is being rotated, whereby the selected memory unit assumes an angular position in accordance with the value of the number being stored, a plurality of longitudinally extending, angularly spaced, fixed contact members, each of said fixed contact members being common to one of the angular positions of said plurality of memory units, said memory units being normally positioned away from said shaft and having contact tips then engaging said fixed contact members in accordance with the angular positions of said memory units, an electric signal circuit associated with each of said fixed contact members, each of said electric circuits including a control switch connected to each of said memory units so that the number being stored by a selected memory unit can be indicated by closing the switch associated therewith and thereby energizing the electric signal circuit associated with the fixed contact member engaged by said contact tip.

2. An information recording and indicating system comprising a longitudinally extending shaft, a plurality of moving memory units, means mounting said memory units in longitudinally spaced, aligned array so as to be each turnable about a longitudinal axis which is parallel to the axis of said shaft and so as to be individually movable towards and away from said shaft, each said movable memory unit having at least three contact tips equally spaced around its periphery, said shaft having drive means adapted to engage a memory unit when it is moved towards said shaft, means for turning said shaft for pre-determined degrees of rotation in accordance with a number to be stored, each of said memory units having a pre-determined number of angular positions for storing a number as an angular displacement, each of said angular positions indicating a different value for a stored number, means for selectively moving one of said memory units into operative engagement with said drive means while said shaft is being rotated, whereby the selected memory unit assumes an angular position in accordance with the value of the number being stored, a plurality of longitudinally extending, equally angularly spaced, fixed contact bars positioned in a part-cylindrical array of angular distance corresponding to the distance between successive contact tips, each of said bars being common to one of the angular positions of said plurality of memory units, said memory units being normally positioned away from said shaft and a respective contact tip of each said memory unit then engaging said bars in accordance with the angular position of said memory units, and an electric signal circuit associated with each of said fixed bars, each of said electric circuits including a control switch connected to each of said memory units so that the number being stored by a selected memory unit can be indicated by closing the switch associated therewith and thereby energizing the electric signal circuit associated with the fixed contact member engaged by said contact tip.

3. An information recording and indicating system in accordance with claim 2, each of said memory units also comprising a plurality of rotary cams, said system also including further switches adapted to be successively closed by said cams in correspondence with the positioning of the successive contact tip in electric engagement with said bars, and further electric signal circuits associated with each of said further switches.

References Cited in the file of this patent

UNITED STATES PATENTS

| | | |
|---|---|---|
| 2,102,700 | Gustafsson et al. | Dec. 21, 1937 |
| 2,480,981 | Thierfelder | Sept. 6, 1949 |
| 2,518,378 | Roggenstein | Aug. 8, 1950 |
| 2,558,961 | Johnson | July 3, 1951 |

FOREIGN PATENTS

| | | |
|---|---|---|
| 897,611 | France | May 30, 1940 |